United States Patent
Martin et al.

(10) Patent No.: US 6,169,496 B1
(45) Date of Patent: Jan. 2, 2001

(54) BANKED FLIGHT STALL WARNING DEVICE AND METHOD

(75) Inventors: Mack L. Martin, Melbourne; Mark G. Baciak, West Melbourne; Louis W. Seiler, Indian Harbour Beach, all of FL (US)

(73) Assignee: Exigent International, Inc., Melbourne, FL (US)

(*) Notice: Under 35 U.S.C. 154(b), the term of this patent shall be extended for 0 days.

(21) Appl. No.: 09/208,828
(22) Filed: Dec. 9, 1998
(51) Int. Cl.[7] .................................................. G08B 23/00
(52) U.S. Cl. ..................... 340/966; 340/965; 340/963; 340/970; 340/957; 701/9; 701/15; 701/16; 244/179; 244/180; 244/181
(58) Field of Search ..................... 340/965, 963, 340/966, 970, 959; 701/9, 15, 17, 16; 244/179, 180, 181

(56) References Cited

U.S. PATENT DOCUMENTS

| 2,596,116 | * | 5/1952 | Bamber ........................ 200/61.58 R |
| 2,638,579 | * | 5/1953 | Dyche, Jr. et al. ................. 340/966 |
| 3,691,356 | * | 9/1972 | Miller ..................................... 701/15 |
| 3,730,461 | * | 5/1973 | Knemeyer ............................ 244/179 |
| 3,776,455 | * | 12/1973 | Gee ........................................ 701/17 |
| 3,828,331 | * | 8/1974 | Brooks ............................ 340/870.06 |
| 3,852,711 | * | 12/1974 | Greene ................................. 340/970 |
| 4,093,158 | * | 6/1978 | Clews et al. ........................ 244/182 |
| 4,093,159 | * | 6/1978 | Gilson ................................. 244/187 |
| 4,096,744 | * | 6/1978 | De Leo et al. ....................... 73/180 |
| 4,149,148 | * | 4/1979 | Miller et al. ........................ 340/721 |
| 4,435,695 | * | 3/1984 | Maris ................................... 340/966 |
| 4,484,191 | * | 11/1984 | Vavra ................................... 340/965 |
| 4,563,684 | * | 1/1986 | Maris ................................... 340/966 |
| 4,590,475 | * | 5/1986 | Brown ................................. 340/966 |
| 4,710,128 | * | 12/1987 | Wachsmuth et al. ................ 434/46 |
| 4,916,448 | * | 4/1990 | Thor .................................... 340/970 |
| 4,924,401 | * | 5/1990 | Bice et al. ............................... 701/6 |
| 5,000,404 | * | 3/1991 | Martorella ........................... 244/188 |
| 5,095,746 | * | 3/1992 | Stanis ................................. 73/178 R |
| 5,096,146 | * | 3/1992 | Orgun et al. ........................ 244/179 |
| 5,225,829 | * | 7/1993 | Bateman ............................. 340/967 |
| 5,426,571 | * | 6/1995 | Jones .................................. 362/466 |
| 5,457,630 | * | 10/1995 | Palmer ................................... 701/3 |
| 5,584,047 | * | 12/1996 | Tuck ................................. 455/13.1 |
| 5,595,357 | * | 1/1997 | Catlin et al. ........................ 244/1 R |
| 5,606,505 | * | 2/1997 | Smith et al. .......................... 701/99 |
| 5,722,620 | * | 3/1998 | Najmabadi et al. ................ 244/181 |
| 5,737,222 | * | 4/1998 | Palmer ................................... 701/4 |
| 6,002,347 | * | 12/1999 | Daly et al. ........................... 340/963 |

* cited by examiner

Primary Examiner—Benjamin C. Lee
(74) Attorney, Agent, or Firm—Akerman Senterfitt

(57) ABSTRACT

A flight warning system comprises an outside temperature probe for sensing outside temperature, a gyroscope for sensing aircraft bank angle, a static transducer for sensing static pressure, and a dynamic pressure sensor for receiving total pressure from a pitot tube. A computer is responsive to the gyroscope, static transducer, outside temperature probe and dynamic pressure sensor calculates whether the aircraft is entering a stall condition by comparing the aircraft's bank angle with the stall bank angle. The computer can also calculate whether sufficient altitude exists for the aircraft to safely return to a field after a power failure. An output device can also be provided for indicating the existence of said sufficient altitude, and a stall indicator can be provided for indicating whether the aircraft is entering a stall condition. A method for determining the existence of a stall condition with the aircraft is also disclosed.

25 Claims, 3 Drawing Sheets

BANKED FLIGHT STALL WARNING DEVICE AND METHOD

CROSS REFERENCE TO RELATED APPLICATIONS (Not Applicable)

STATEMENT REGARDING FEDERALLY SPONSORED RESEARCH OR DEVELOPMENT (Not Applicable)

FIELD OF THE INVENTION

This invention relates to aircraft flight control systems. More particularly, this invention relates to a new and improved system and method for indicating the availability of theoretically safe return path to a landing field after a power failure and for indicating whether the airplane is subjected to restricted lateral maneuvering during powered or non-powered flight.

BACKGROUND OF THE INVENTION

A particularly serious scenario that can occur during the operation of an aircraft is sudden power failure at low altitudes, as with returning to a landing field or during takeoff, and commonly known as stall spin failures. Flight training schools currently teach that for power failures on takeoff a pilot should attempt a straight-ahead landing. Often, a more appropriate action for a pilot to take is to return to the field from which the pilot originally took off because of the potential difficulties presented by such a landing, including but not limited to, obstructions, landing on water, and hilly terrain. This particular maneuver is commonly known as a "Turnback" or a "Tear-Drop" return.

A properly executed Turnback procedure requires the pilot to immediately decrease the aircraft pitch a few degrees below the horizontal. The pilot is also required to execute a turn around a "Stall Cylinder". A Stall Cylinder is an imaginary cylinder to which the aircraft should always be tangent. The diameter of the Stall Cylinder is a function of the speed of the aircraft, the particular aircraft's aerodynamic characteristics, and the pitch-down angle chosen by the pilot such that if the aircraft enters the Stall Cylinder boundary, the aircraft will lose sufficient lift and thus stall. Therefore, to maintain a safe path, the pilot must execute the turn around the Stall Cylinder without penetrating the Stall Cylinder. The pilot continues the turn at the appropriate constant pitch and bank angles until the aircraft has traveled approximately 240 degrees around the Stall Cylinder. At this point, the pilot rolls the aircraft to zero bank angle and establishes a straight-line descent to the field.

Although a Turnback may be the most appropriate action to take in the situation of a sudden power failure at takeoff, the Turnback maneuver itself can be deadly. Several factors, including panic and the pilot's lack of attention to the aerodynamics involved, lead to the hazardous nature of this maneuver. For example, a minimal starting altitude, depending upon the type of aircraft, is required before the maneuver can be accomplished. If the maneuver is attempted at a starting altitude below the minimum, either the pilot will fail to reach the field or the pilot may enter into the Stall Cylinder in an attempt to hurry the turn, thereby creating a stall condition. Also, even when an adequate starting altitude is present, the panic that ensues after a power failure can lead some pilots to neglect instrumentation and aircraft performance. In such situations, the pilot may attempt to return quickly to the take off field to land the aircraft, and in so doing executes such a tight turn that brings the aircraft within the Stall Cylinder which results in a stall of the aircraft or "stall spin". Statistics from the National Transportation and Safety Board (NTSB) indicate that 72% of all "stall spin" accidents are fatal.

One device for a stall avoidance system is disclosed in U.S. Pat. No. 4,590,475 to Brown. The Brown patent discloses a stall avoidance system for aircraft. The system uses flight measurements such as acceleration, aircraft configuration, engine power, atmospheric conditions and other related characteristics in computing the speed at which a specific aircraft is likely to stall in real time. The system includes an audible warning to inform a pilot when conditions are approaching the projected stall speed. However, the Brown device requires considerable aircraft specific information to be inputted manually including weight, detailed wing surface area, detailed tail surface area, engine thrust, known stalling angle of attack, and known stalling speed. This system also requires nearly a dozen sensors. Because of the system's complexity it is expensive and it cannot be easily retrofitted into a light aircraft. The system may also require wind tunnel testing for each aircraft type. Additionally, this system does not provide guidance to a pilot in accomplishing a safe landing.

A method of predicting the approaching stall of an aircraft wing is disclosed in U.S. Pat. No. 4,563,684 to Marris. The Marris patent discloses an apparatus that senses airspeed fluctuations over the top surface of a wing and uses that information to determine whether a stall condition is impending. However, as with the Brown device, the Marris device does not provide guidance to a pilot in accomplishing a safe landing.

Thus, there is not any aircraft flight control system specifically designed as a safety device that currently indicates to the pilot whether a safe maneuver can be accomplished after a sudden power failure has occurred or any aircraft flight control system that calculates a safe glide path and communicates that flight path information so that the aircraft can be landed safely.

SUMMARY OF THE INVENTION

It is an object of this invention to provide a stall warning system that indicates a glide path after a sudden power failure has occurred.

It is another object of this invention to provide a stall warning system that calculates a safe flight path and communicates that path information to either the pilot or aircraft such that the aircraft can be directed to follow that flight path. The flight information can be provided either electronically, visually, and/or audibly.

It is yet another object of this invention to provide a stall warning system that displays parameters useful during normal flight.

It is still another object of this invention to provide a stall warning system that can be installed with minimal intrusion into an aircraft.

Another object of this invention is to provide a stall warning system that warns the pilot when aircraft limits are about to be exceeded in any near constant altitude flight, whether powered or not, when restricted lateral maneuvering occurs.

In accordance with the invention, these and other objects are accomplished by providing a plurality of sensors for describing a flight path and stall conditions as an aircraft takes off from a field and a computer processor responsive to the plurality of sensors for determining the existence of a theoretically safe return path to the field after a power failure. The departure flight path and stall conditions to be derived from the plurality of sensors can be altitude, bank angle, and stall bank angle, and these sensors can include an outside temperature probe for sensing outside temperature; a gyroscope for sensing bank angle; a static transducer for sensing static pressure; and a dynamic pressure sensor for receiving total/static pressure from a pitot tube in the aircraft. The plurality of sensors can also include an engine system sensor for sensing whether the engine has ceased to provide power to the aircraft.

A recording device can also be added for recording information received from the plurality of sensors. An output device such as an indicator lamp can also be included for indicating the existence of the theoretically safe glide path. The indicator lamp can also indicate whether the aircraft is following the theoretically safe glide path. The output device can also include auditory alarms for indicating the theoretically safe flight path or whether the aircraft is following the theoretically safe glide path. The output device can also include a graphical and/or digital displays to display flight path characteristics including: outside air temperature; altitude; banking load factor; calibrated airspeed; true airspeed; stall bank angle; stall speed; bank angle; corrected stall speed; and, turning radius.

A method is also disclosed for indicating a theoretically safe flight path for an aircraft after a power failure during a departure flight of the aircraft including the steps of sensing a plurality of parameters; and, determining and indicating the theoretically safe glide path. The method can also include the step of continuously redetermining and reindicating the theoretically safe path. The method can include still an additional step of initializing the plurality of parameters before the departure flight. Another step that can be included in the method is providing an indicator to inform a pilot whether the aircraft is following the theoretically safe flight path.

BRIEF DESCRIPTION OF THE DRAWINGS

There are shown in the drawings embodiments of the invention that are presently preferred, it being understood, however, that the invention is not limited to the precise arrangements and instrumentalities shown, wherein.

DETAILED DESCRIPTION OF THE PREFERRED EMBODIMENTS

Figure 1:
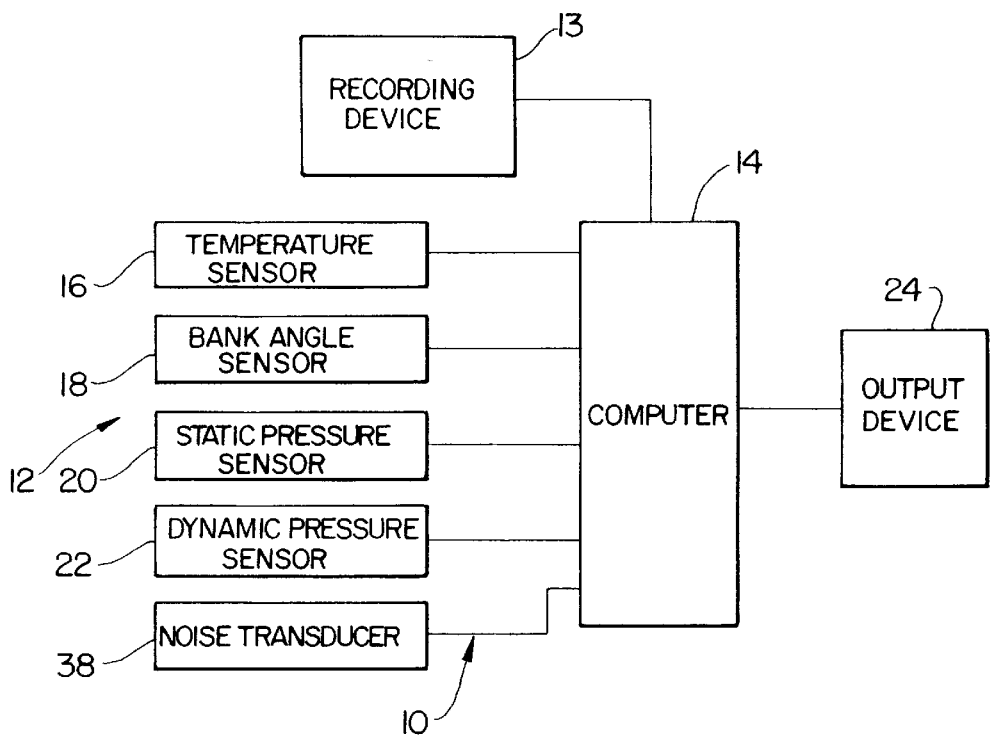
FIG. 1 is a block diagram of the hardware used for a banked flight stall warning system.

FIG. 1 illustrates a stall warning device 10 according to the invention. The stall warning device 10 includes a plurality of sensors 12 for sensing a departure flight path and stall conditions for an aircraft. The device 10 also includes a computer 14 responsive to said plurality of sensors for determining whether stall conditions exists or whether sufficient altitude exists for the aircraft to return to a field after a sudden power failure after takeoff. The plurality of sensors 12 are comprised of various sensing devices that are capable of providing sufficient information for the computer 14 to determine airplane bank angle $\phi_a$ and stall bank angle $\phi_s$. The plurality of sensors 12 can include sensors internal to the stall warning device 10 or inputs for receiving information from sensors already existing within the aircraft. An output device 24 responsive to the computer 14 can be provided for communicating aircraft flight characteristic data to the aircraft and/or pilot, for alerting the pilot of a stall condition, and for alerting the pilot of sufficient altitude exists for the aircraft to return to a field after a sudden power failure.

A power source (not shown) can also be provided for providing power to operate any or all of the computer 14, the plurality of sensors 12, or the output device 24. Power sources are well known within the field of aircraft control systems and all are acceptable for this purpose. The power source can be internal to the stall warning device 10, for example a battery, or as presently preferred, the power source can be a outlet into which external power is supplied from the aircraft. If used, the internal power source would optimally have a high power to weight ratio to ensure that the stall warning device 10 does not become too heavy to be used with light aircraft.

The presently preferred plurality of sensors 12 includes a temperature sensor 16, a bank angle sensor 18, a static pressure sensor 20, and a dynamic pressure sensor 22. These sensors 16, 18, 20 and 22 are presently preferred because they can be installed into an aircraft with minimal intrusion. However, the invention is not limited as to these particular sensors 16, 18, 20, 22. Any plurality of sensors 12 capable of providing sufficient information for the computer 14 to determine bank angle $\phi_a$ and stall bank angle $\phi_s$ is acceptable.

Temperature sensors 16 are well known in the art, and any can be selected for use with this device. Although the temperature sensor 16 is not limited as to an operating range, the temperature sensor 16 should be capable of sensing temperature within the range of temperature encountered by an aircraft. The temperature sensor 16 should also be capable of being repeatedly sampled by the computer 14. The temperature sensor 16 can optionally be a sensor already existing within the aircraft, or as presently preferred, the temperature sensor 16 can be a probe connected to the stall warning device 10 that can be positioned in various locations on the aircraft that sense free stream temperature. The probe can be located anywhere on the aircraft, so long as the probe takes an accurate reading of outside air temperature.

Bank angle sensors 18 are well known in the art, and any can be selected for use with this device. The bank angle sensor 18 can optionally be a sensor already existing within the aircraft, or as presently preferred, the bank angle sensor 18 can be a gyroscope internal to the stall warning device 10. The bank angle sensor 18 should also be capable of being repeatedly sampled by the computer 14. Most turn and bank indicators that are already provided with the aircraft do not have voltages outputs. However, if the gyroscope provided with the aircraft does have a voltage output, the bank angle sensor 18 need only be a lead from the computer 14 to the voltage output of the gyroscope already provided with the aircraft.

Static pressure sensors 20 are well known in the art, and any static pressure sensor 20 that reads outside static pressure can be selected for use with this device. The static pressure sensor 20 should also be capable of being repeatedly sampled by the computer 14. The static pressure sensor 20 can optionally be a sensor already existing within the aircraft, or as presently preferred, the static pressure sensor 20 can be a static transducer internal to the stall warning device 10, sensing static pressure from the existing aircraft system.

Dynamic/static pressure sensors 22 are well known in the art, and any can be selected for use with this device. The presently preferred dynamic pressure sensor 22 receives data reflecting total pressure from a pitot tube located on a wing of the aircraft. The dynamic pressure sensor 22 should also be capable of being repeatedly sampled by the computer 14. Pitot tubes typically supply total pressure and can supply static and differential (dynamic) pressure information to the computer 14 via transducers.

The stall warning device 10 can optionally include a recording device 13. The recording device 13 records data from any combination of the plurality sensors 12, the computer 14, or pre-existing sensors located in the aircraft. Thus, the recording device 13 can act as a "black box" from which aircraft flight characteristic data and other data can be retrieved. Any device capable of recording data is acceptable; however, the presently preferred recording device 13 is an EEPROM. A single chip record/playback device can also be used as the recording device 13. Additionally, both the EEPROM and single chip record/play back device can be used.

Figure 2:
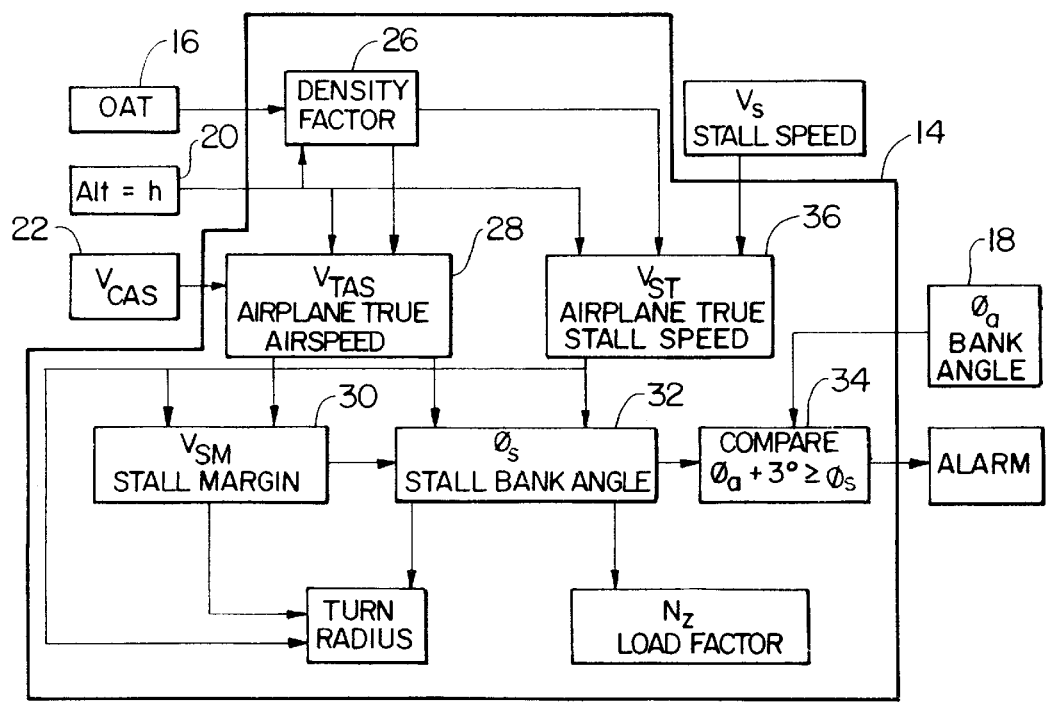
FIG. 2 is a block diagram of processing steps by the processor shown in FIG. 1.

FIG. 2 illustrates in block diagrammatic form how particular information received from the plurality of sensors 12 is used by the computer 14 to determine whether the aircraft is approaching a stall by solving equations that describe a stall condition. Any equations that use information obtained from the plurality of sensors 12 to determine whether the aircraft is approaching a stall condition are acceptable. However, the presently preferred equations require data as to outside air temperature OAT, altitude h, calibrated airspeed $V_{CAS}$, and bank angle $\phi_a$. The presently preferred equations also require a fixed parameter of aircraft sea level (SL) stall speed $V_s$ (as shown in block 31) for standard day conditions (59° F.). This stall speed $V_s$ can be obtained from the aircraft manufacturer and be stored within the computer 16.

The presently preferred equations calculate density factor $F_d$ (as shown in block 26), true airspeed $V_{TAS}$ (as shown in block 28), stall margin $V_{SM}$ (as shown in block 30), and airplane true stall speed $V_{ST}$ (as shown in block 36). By using outside air temperature OAT in the equations, true airspeed $V_{TAS}$ can be calculated for non-standard day conditions. These equations solve for density factor $F_d$, true airspeed $V_{TAS}$, stall margin $V_{SM}$, and airplane true stall speed VST and are utilized to calculate a stall bank angle $\phi_s$ (as shown in block 32) The stall bank angle $\phi_s$ indicates the angle at which the aircraft will stall if the aircraft is banked at that angle. A stall being a condition at which lift on the aircraft is insufficient to sustain the weight of the aircraft. The stall bank angle $\phi_s$ can then be compared to a bank angle $\phi_a$ to determine whether the aircraft is approaching a stall.

The data needed to calculate stall bank angel $\phi_s$ is obtained from the plurality of sensors. The temperature sensor 16 obtains data reflecting the outside air temperature OAT. The static pressure sensor 20 obtains data reflecting the static pressure and thus altitude h. The bank angle sensor 18 obtains data reflecting the bank angle $\phi_a$ of the aircraft. The dynamic pressure sensor 22 obtains data reflecting dynamic pressure, and calibrated airspeed $V_{CAS}$ is calculated using the equation:

$$V_{CAS} = 39.156595 * \sqrt{\sqrt{q}}$$

where q=Dynamic Pressure (inches water)
psi=0.0360950*$q_i$

This incompressible flow equation is valid for speed below 200 knots, and the equation varies slightly from the more complicated compressible flow equation up to these speeds. This equation can be safely used with general aircraft where a stall condition at a speed of 200 knots could only occur at very steep bank angles (85 degrees) and extremely high load factors (11 g's).

Once the data has been obtained from the plurality of sensors, the following flight characteristic values are solved for:

Density factor $F_d$ is calculated using the variables of outside air temperature OAT and altitude h with the following equation:

$$F_d = \frac{518.63}{((OAT + (0.003566 * h)) + 459.63)}$$

This equation derives density factor $F_d$ at sea level conditions by factoring modifly outside air temperature OAT with respect to altitude h. Airplane true airspeed $V_{TAS}$ is calculated using the variables of density factor $F_d$, calibrated airspeed $V_{CAS}$, and altitude h with the following equation:

$$V_{TAS} = V_{CAS} * \sqrt{\frac{1}{F_d}\left(1 - 0.006875\left(\frac{h}{1000}\right)\right)^{-4.256}}$$

Airplane true stall speed $V_{ST}$ is calculated using the variables of altitude h, stall speed $V_s$, and density factor $F_d$ with the following equation:

$$V_{ST} = V_s \sqrt{\frac{1}{F_d}(1 - 0.006875(h/1000))^{-4.256}}$$

Stall margin $V_{SM}$ is calculated using the variables of airplane true airspeed $V_{TAS}$ and airplane true stall speed $V_{ST}$ with the following equation:

$$V_{SM} = V_{TAS} - V_{ST}$$

Stall bank angle $\phi_s$ is calculated using the variables of airplane true stall speed $V_{ST}$ and stall margin $V_{SM}$ with the following equation:

$$\phi_s = a\cos\left(\frac{V_{ST}}{(V_{ST} + V_{SM})}\right)^2$$

Once stall bank angle $\phi_s$ is calculated, the computer 14 compares the bank angle $\phi_a$ to the stall bank angle $\phi_s$. If the bank angle $\phi_a$ plus a margin of safety $\phi_{ms}$ is greater than or equal to the stall bank angle $\phi_s$, ($\phi_a \phi_{ms}) \geq \phi_s$ (as shown in block 34) the computer 14 will activate an alarm 36. The alarm 36 generated is discussed in greater detail later in the specification. The margin of safety $\phi_{ms}$ can be fixed or a set of default values for each aircraft type. The margin of safety $\phi_{ms}$ can also vary depending upon the aircraft type or other parameters that tend to affect flight characteristics.

Figure 3:
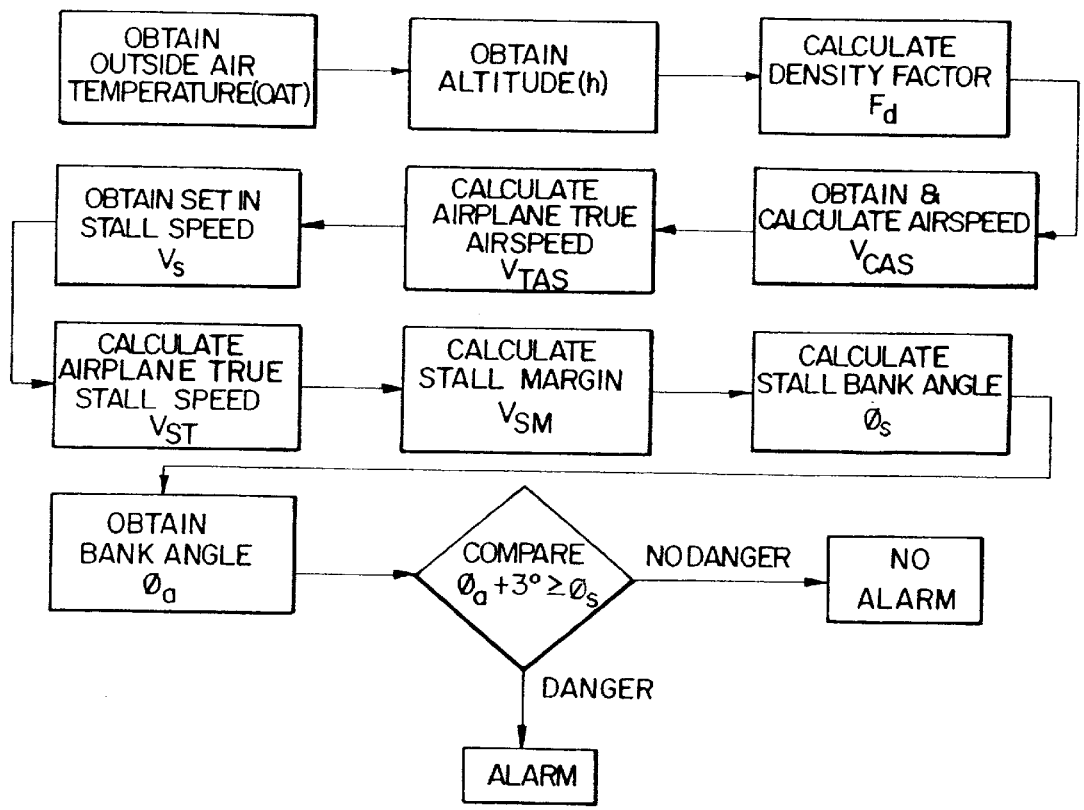
FIG. 3 is a flow chart showing steps required to calculate stall bank angle.

FIG. 3 illustrates the presently preferred process to calculate stall bank angle $\phi_s$. Outside air temperature OAT and altitude h are obtained. From these variables density factor $F_d$ is calculated. Once calibrated airspeed $V_{CAS}$ is calculated from dynamic pressure, $V_{TAS}$ is calculated using density factor $F_d$, calibrated airspeed $V_{CAS}$, and altitude h. After obtaining the stall speed $V_S$, airplane true stall speed $V_{ST}$ is calculated using altitude h, stall speed $V_S$, and density factor $F_d$. The stall margin $V_{SM}$ can then be calculated using airplane true airspeed $V_{TAS}$ and airplane true stall speed $V_{ST}$. Stall bank angle $\phi_s$ is finally calculated using airplane true stall speed $V_{ST}$ and stall margin $V_{SM}$.

Figure 4:
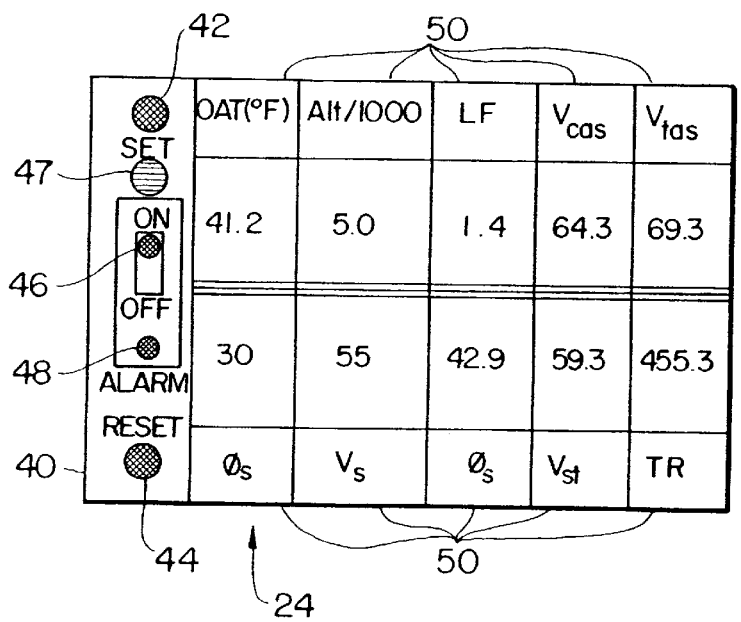
FIG. 4 is a front view of the output device shown in FIG. 1.

The presently preferred output device 24 is a panel display 40 illustrated in FIG. 4. The presently preferred panel display 40 displays flight characteristic values useful in normal flight and includes a set switch 42 for selecting options, for example selecting aircraft type, a reset switch 44 for reinitializing the options, an on/off switch 46 to activate the flight warning system 10, an alarm indicator 48, and a plurality of flight characteristic displays 50.

The output device 24 can optionally be connected to an automatic pilot, not shown. The output device 24 could then supply aircraft control information to the automatic pilot to execute a safe maneuver without the danger of the aircraft entering a stall spin condition. This can be accomplished with an optional global positioning system, not shown. Information from the global positioning along with information regarding aircraft altitude h can be used to indicate the aircraft's precise location. Also, the output device 24 could supply aircraft control information to the automatic pilot for executing a banked turned about a fixed location without the danger of the aircraft entering a stall spin condition.

The alarm indicator 48 indicates to the pilot whether sufficient altitude exists for the aircraft to safely return to the field after a sudden power failure during takeoff, and any type of alarm indicator 48 capable of performing that function is acceptable. The presently preferred alarm indicator 48 uses an indicator lamp to indicate whether sufficient altitude exists to return to the field. Many variations of using an indicator lamp or lamps are possible and all these variations are acceptable. For example, two lights could be provided with one light signaling sufficient altitude exists and the other light indicating that sufficient altitude does not exist. The presently preferred light configuration is to have the light 48 be illuminated red until the aircraft reaches an altitude at which the pilot can safely attempt a return to the field. After that altitude has been reached, the light 48 will be turned off. Additionally, the presently preferred stall warning device 10 includes an audio device 47 that creates an audible indication, for example an audible "safe", to signal the existence of a sufficient altitudes to attempt a Turnback maneuver.

A stall indicator can be added to indicate whether the aircraft is close to reaching a stall spin condition. Any type of indicator is acceptable for this purpose; however, the presently preferred stall indicator uses the light 48 to indicate that the aircraft is approaching a stall spin condition. The presently preferred stall indicator can also use the audio device 47 as an auditory indicator alerting the pilot when the aircraft bank angle is within 3° of the stall bank angle $\phi_s$ 32. Also, the stall indicator illuminates the light 48 1° before the auditory indicator alerts the pilot when the aircraft bank angle is within 3° of the stall bank angle $\phi_s$. This small angle of maneuvering will provide the best turn radius for the aircraft because any bank angle $\phi_a$ steeper than the stall bank angle $\phi_s$ will create a stall spin condition. Another alarm can also sound if the airspeed is too high or too low.

The presently preferred auditory indicators are verbal alarms with the preferred verbal commands being "Caution" when the aircraft is entering the 3° window; "Too Steep!" when the bank angle is about to enter the Stall Cylinder; "Nose Down!" when the airspeed is dropping below the stall margin; and "Nose Up!" when the airspeed is above the stall margin. These verbal commands will aid the pilot in the proper control/manipulation of the aircraft to correct for the impending stall or non-optimal condition. During normal flight, the audio device 47 can be muted. The combination of the light 48 and the auditory indicator provide several levels of warning, and this advantageously prevents the pilot from entering the stall cylinder.

The flight characteristic display 50 displays various flight characteristic values and is not limited as to the amount or type of flight characteristic values displayed. Any device capable of displaying the flight characteristics is acceptable. Examples of a flight characteristic display 50 includes, but is not limited to, a graphical display and/or a digital display. The type of flight characteristic values displayed are those that can be derived from information received from any combination of the plurality sensors 12, the computer 14, or pre-existing sensors located in the aircraft. The present preferred flight display 50 displays outside air temperature OAT, altitude h, load factor LF, calibrated airspeed $V_{cas}$, true airspeed $V_{tas}$, stall bank angle $\phi_s$, aircraft bank angle $\phi_a$, corrected stall speed $V_{st}$, and turning radius TR. The flight characteristic values whose equations have not been previously disclosed are:

$LF = 1/\cos(\phi_s)$ {for near constant level flight (less than +/−7 degrees)}

$$TR = \frac{(V_{st} + V_{sm})^2}{g * \tan(\phi_s)}$$

Figure 5:
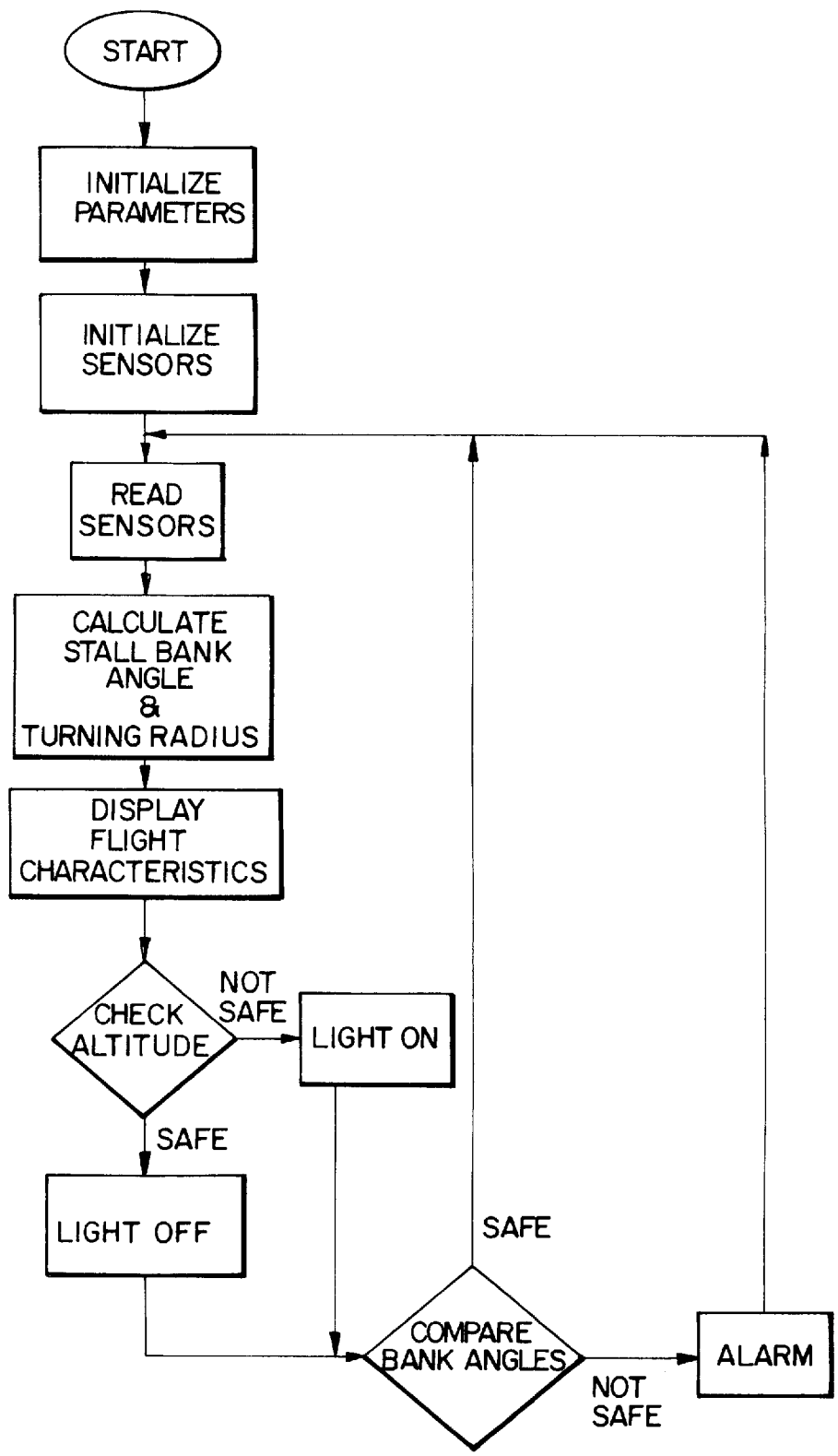
FIG. 5 is a flow chart showing the operation of the stall warning device.

FIG. 5 is a flow diagram illustrating method steps according to the invention. An initial step of the method is to initialize the computer 14. Preferably, this step would be undertaken when the aircraft is at the landing field and prior to take off to obtain initial data, such as takeoff field altitude $h_{fa}$, that cannot be obtained when the aircraft is in flight. Also, an additional step during the beginning of the method would be to calibrate any or all of the plurality of sensors 12. Depending upon the type of sensors used, some of the plurality of sensors 12 may require initial settings for comparison purposes.

The method further comprises sensing an aircraft bank angle $\phi_a$ and a plurality of parameters. The presently preferred plurality of parameters are air temperature OAT, altitude h, and calibrated airspeed $V_{CAS}$. However, any parameters from which a stall bank angle $\phi_s$ can be calculated are acceptable. Once the plurality of parameters are sensed, a stall bank angle $\phi_s$ is calculated with equations using the plurality of parameters. The presently preferred equations to calculate a stall bank angle $\phi_s$ have been previously discussed.

Once the plurality of sensors 12 begin operating and data is received by the computer 14, one step is to display various flight characteristic values. The method is not limited as to the amount or type of flight characteristic values displayed. The type of flight characteristic values displayed are those that can be derived from the plurality of parameter and the bank angle $\phi_a$.

An additional step is to determine whether sufficient altitude exists to execute a Turnback maneuver after sudden power loss during takeoff. The presently preferred method of determining the existence of sufficient altitude is to calculate a safe altitude $h_s$ and compare the safe altitude $h_s$ with the current altitude h. Once the current altitude is greater than the safe altitude $h_s$, a theoretically safe return path is possible. The safe altitude is determined using the equation:

$$h_s = h_{fa} + SF$$

where $h_{fa}$ is the takeoff field altitude and SF is a safety factor. The safety factor SF can either be preset or calculated. Example factors to consider when selecting or calculating the safety factor SF include the takeoff field altitude $h_{fa}$, the aircraft characteristics, airplane true airspeed $V_{TAS}$, and outside air temperature OAT. The presently preferred safety factor SF is a preset value of 500 feet.

Once the safe altitude $h_s$ and altitude h has been compared, an indicator can be activated. As previously discussed, many types of indicators are known in the art of aircraft control systems and any are acceptable for this purpose. The presently preferred indicator is to illuminate a light 48 when the current altitude h is below the safe altitude $h_s$ and to turn off the light 48 when the current altitude h is above the safe altitude $h_s$.

Another step of the process is to have the computer 14 compare the bank angle $\phi_a$ to the stall bank angle $\phi_s$. If the bank angle $\phi_a$ plus a margin of safety $\phi_{ms}$ is greater than or equal to the stall bank angle $\phi_s$ $$(\phi_a + \phi_{ms}) \geq \phi_s$$

the processor will indicate that the aircraft is approaching a stall by activating an alarm. The presently preferred alarm is a combination of separate audible and visual alarms. The presently preferred margin of safety $\phi_{ms}$ before the visual alarm 48 is activated is 4°, and the presently preferred margin of safety $\phi_{ms}$ before the audible alarm is activated is 3°.

Still another step is to determine whether a power failure has occurred. Any particular method can be used to determine power failure. For instance, a noise transducer 38 can be placed in the cockpit to pick up the noise/vibration caused by the engine 39. Because a given engine 39 produces a certain vibration at power and a different vibration when not at power, by comparing the current vibration to the full-power vibration, whether the engine 39 is at power can be determined. Optionally, this noise transducer 38 can be used with the recording device 13 to record cockpit noise including pilot conversation. Once a determination that a power failure has occurred, an alarm can be sounded to alert the pilot. The final step of the process is to continue sensing information with the plurality of sensors 12 and repeat the method until the stall warning device 10 is turned off.

What is claimed is:

1. A flight warning system, comprising:
    a plurality of sensors for describing stall conditions indicating a stall of an aircraft, said stall conditions including aircraft bank angle and stall bank angle;
    means responsive to said plurality of sensors for computing a stall cylinder; and,
    means responsive to said plurality of sensors for determining whether said aircraft is entering said stall cylinder.

2. A flight warning system as recited in claim 1, wherein said plurality of sensors include:
    an outside temperature probe for sensing outside temperature;
    a gyroscope for sensing bank angle;
    a static transducer for sensing static pressure; and
    a dynamic pressure sensor for receiving total pressure from a pitot tube in the aircraft.

3. A flight warning system as recited in claim 2, wherein said static transducer receives said static pressure from an existing static pressure system.

4. A flight warning system as recited in claim 1, further comprising a recording device for recording information from said plurality of sensors.

5. A flight warning system as recited in claim 1, further comprising a stall indicator for indicating whether said aircraft is approaching said stall cylinder.

6. A flight warning system as recited in claim 5, wherein said stall indicator includes a visual indicator.

7. A flight warning system as recited in claim 5, wherein said stall indicator includes an auditory indicator.

8. A flight warning system as recited in claim 1, wherein said means responsive to said plurality of sensors is a computer.

9. A flight warning system as recited in claim 8, further comprising a display responsive to said computer for indicating flight path characteristics.

10. A flight warning system as recited in claim 9, wherein said flight path characteristics include:
    outside air temperature;
    altitude;
    load factor;
    calibrated airspeed;
    true airspeed;
    stall bank angle;
    stall speed;
    aircraft bank angle;
    corrected stall speed; and,
    turning radius.

11. A flight warning system as recited in claim 8, wherein said computer is responsive to aircraft specific parameters.

12. A flight warning system as recited in claim 11, wherein said aircraft specific parameters is a known stalling speed of the aircraft.

13. A flight warning system, comprising: sensors for describing a departure flight path as an aircraft takes off from a field;
    means responsive to said sensors for comparing current altitude of said aircraft to a sufficient altitude for the aircraft to safely return to said field after a power failure; and,
    an output device for indicating said aircraft has achieved said sufficient altitude.

14. A flight warning system as recited in claim 13, wherein said sensors include a static transducer for sensing static pressure.

15. A flight warning system as recited in claim 13, wherein said output device includes a light whereby said light is illuminated when said sufficient altitude has not been achieved and said light is unilluminated when said sufficient altitude is achieved.

16. A flight warning system as recited in claim 13, wherein said sensors further includes an engine system sensor for sensing said power failure.

17. A flight warning system for an aircraft, comprising:
    an outside temperature probe for sensing outside temperature;
    a gyroscope for sensing aircraft bank angle;
    a static transducer for sensing static pressure; and
    a dynamic pressure sensor for receiving total pressure from a pitot tube;
    means responsive to said gyroscope, static transducer, outside temperature probe and dynamic pressure sensor for computing a stall cylinder;

means responsive to said gyroscope, static transducer, outside temperature probe and dynamic pressure sensor for determining whether said aircraft is entering said stall cylinder; and, a stall indicator for indicating whether said aircraft has penetrated said stall cylinder.

18. A flight warning system as recited in claim 17, wherein determining whether said aircraft is entering said stall cylinder is determined by comparing aircraft bank angle with stall bank angle, whereby said stall exists when the aircraft bank angle is greater than or equal to the stall bank angle.

19. A flight warning system as recited in claim 17, wherein said means responsive to said gyroscope, static transducer, outside temperature probe and dynamic pressure sensor further calculates whether sufficient altitude exists for said aircraft to safely return to a field after a power failure, said flight warning system further comprising an output device for indicating the existence of said sufficient altitude.

20. A method for indicating whether an aircraft has penetrated a stall cylinder, comprising the steps of:

sensing an aircraft bank angle and a plurality of parameters;

calculating a stall bank angle from said plurality of parameters;

determining if said aircraft has penetrated a stall cylinder by comparing said aircraft bank angle to said stall bank angle, whereby said aircraft has penetrated said stall cylinder when said aircraft bank angle is greater than or equal to said stall bank angle; and, indicating whether said aircraft is approaching said stall cylinder based on said comparison.

21. A method for indicating whether an aircraft is approaching a stall as recited in claim 20, further comprising continuously:

resensing said aircraft bank angle and said plurality of parameters;

recalculating said stall bank angle;

determining if said aircraft has penetrated said stall cylinder by recomparing said aircraft bank angle to said stall bank angle; and, reindicating whether said aircraft is approaching said stall cylinder.

22. A method for indicating whether an aircraft is approaching a stall as recited in claim 20, further comprising initializing said plurality of parameters before takeoff of said aircraft from a departure field.

23. A method for indicating whether an aircraft is approaching a stall as recited in claim 20, further comprising calculating and indicating whether sufficient altitude exists for said aircraft to return to a field after a sudden power failure during takeoff.

24. A method for determining a stall bank angle for an aircraft in a banked turn, comprising the steps of:

measuring outside air temperature, altitude, and dynamic pressure;

determining a true stall speed and a stall margin from data obtained in said measuring step and from a predetermined set-in stall speed; and, determining a stall bank angle, beyond which said aircraft will stall in flight, from said true stall speed and stall margin, whereby said stall bank angle indicates a maximum angle at which said aircraft can bank before entering a stall.

25. A computer apparatus programmed with a routine set of instructions stored in a fix medium, said computer apparatus comprising:

means for storing parameters including a set-in stall speed and measured altitude, outside air temperature, and dynamic pressure;

means for determining a true stall speed from said parameters;

means for determining a stall margin from said parameters;

means for determining a stall bank angle, beyond which said aircraft will stall in flight, from said true stall speed and stall margin, whereby said stall bank angle indicates a maximum angle at which said aircraft can bank before entering a stall.

* * * * *

UNITED STATES PATENT AND TRADEMARK OFFICE
CERTIFICATE OF CORRECTION

PATENT NO.    : 6,169,496 B1                                    Page 1 of 1
DATED         : January 2, 2001
INVENTOR(S)   : Mack L. Martin, Mark G. Baciak and Louis W. Seiler It is certified that error appears in the above-identified patent and that said Letters Patent is hereby corrected as shown below:

Column 6,
Line 58, replace "$(\Phi_a \Phi_{ms})$" with -- $(\Phi_a + \Phi_{ms})$ --.

Signed and Sealed this

First Day of January, 2002

Attest:

JAMES E. ROGAN
Attesting Officer        Director of the United States Patent and Trademark Office